United States Patent [19]
Junkers

[11] Patent Number: 5,318,397
[45] Date of Patent: Jun. 7, 1994

[54] MECHANICAL TENSIONER

[76] Inventor: John K. Junkers, 7 Arrowhead La., Saddle River, N.J. 07540

[21] Appl. No.: 879,342

[22] Filed: May 7, 1992

[51] Int. Cl.$^5$ ............................................. F16B 37/08
[52] U.S. Cl. ................................... 411/432; 411/223
[58] Field of Search .............. 411/432, 433, 429, 434, 411/222, 224, 223, 190, 349, 237, 243, 244, 272, 292, 371, 368, 533, 534, 917, 263, 932, 264, 990

[56] References Cited

U.S. PATENT DOCUMENTS

| 443,117 | 12/1890 | Sharaf | 411/429 X |
|---|---|---|---|
| 794,781 | 7/1905 | Clausen | 411/918 X |
| 1,109,295 | 9/1914 | Lampert | 411/918 X |
| 3,435,777 | 4/1969 | Schaaf | 411/432 X |
| 3,565,472 | 2/1971 | Sjoholm | 403/22 |
| 4,240,670 | 12/1980 | Zorn et al. | 411/432 X |
| 5,137,408 | 8/1992 | Junkers | 411/432 |

FOREIGN PATENT DOCUMENTS

| 2696 | 7/1880 | United Kingdom | 411/223 |
|---|---|---|---|
| 120642 | 11/1918 | United Kingdom | 411/223 |
| 9203666 | 3/1992 | PCT Int'l Appl. | 411/432 |

Primary Examiner—Rodney M. Lindsey
Attorney, Agent, or Firm—Michael J. Striker

[57] ABSTRACT

A mechanical tensioner for elongating and relaxing a stud having an axis and arranged in an object, comprises at least two parts including a first part connectable with the stud and a second part connected with the first part, and a friction element which cooperates with at least one of the parts so as to change a coefficient of friction between the parts so that one of the parts has a higher coefficient of friction than another part and when a force is applied to at least one of the parts in a transverse direction to the axis, the second part moves only in the transverse direction and the first part moves only in an axial direction to move the stud in the axial direction.

1 Claim, 2 Drawing Sheets

MECHANICAL TENSIONER

BACKGROUND OF THE INVENTION

The present invention relates to a mechanical tensioner for elongating and relaxing a stud arranged in an object, such as for example a flange and the like.

Tensioners of the above mentioned general type are known in form for example of a mechanical nut which has two elements movable relative to one another in opposite axial directions to elongate or relax a stud. There are however many applications where no gaskets are used to seal the two flange portions or where the stud is oversized relative to the required clamping force. Therefore, with a steel-to-steel flange connection there is no compression feasible, and with an oversized stud there is no stud elongation feasible, and thus axial movement of one of the parts becomes possible.

SUMMARY OF THE INVENTION

Accordingly, it is an object of the present invention to provide a mechanical tensioner which is a further improvement of known tensioners and eliminates the disadvantages of the prior art.

In keeping with these objects and with others which will become apparent hereinafter, one feature of the present invention resides, briefly stated, in a mechanical tensioner for elongating and relaxing a stud having an axis and arranged in an object, having at last two parts including a first part connectable with said stud and a second part connected with said first part, and a friction element which cooperates with at least one of said parts so as to change a coefficient of friction between said parts so that one of said parts has a higher coefficient of friction than another part and when a force is applied to at least one of said parts in a transverse direction to said axis, said second part moves only in said transverse direction and said first part moves only in an axial direction to move said stud in said axial direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
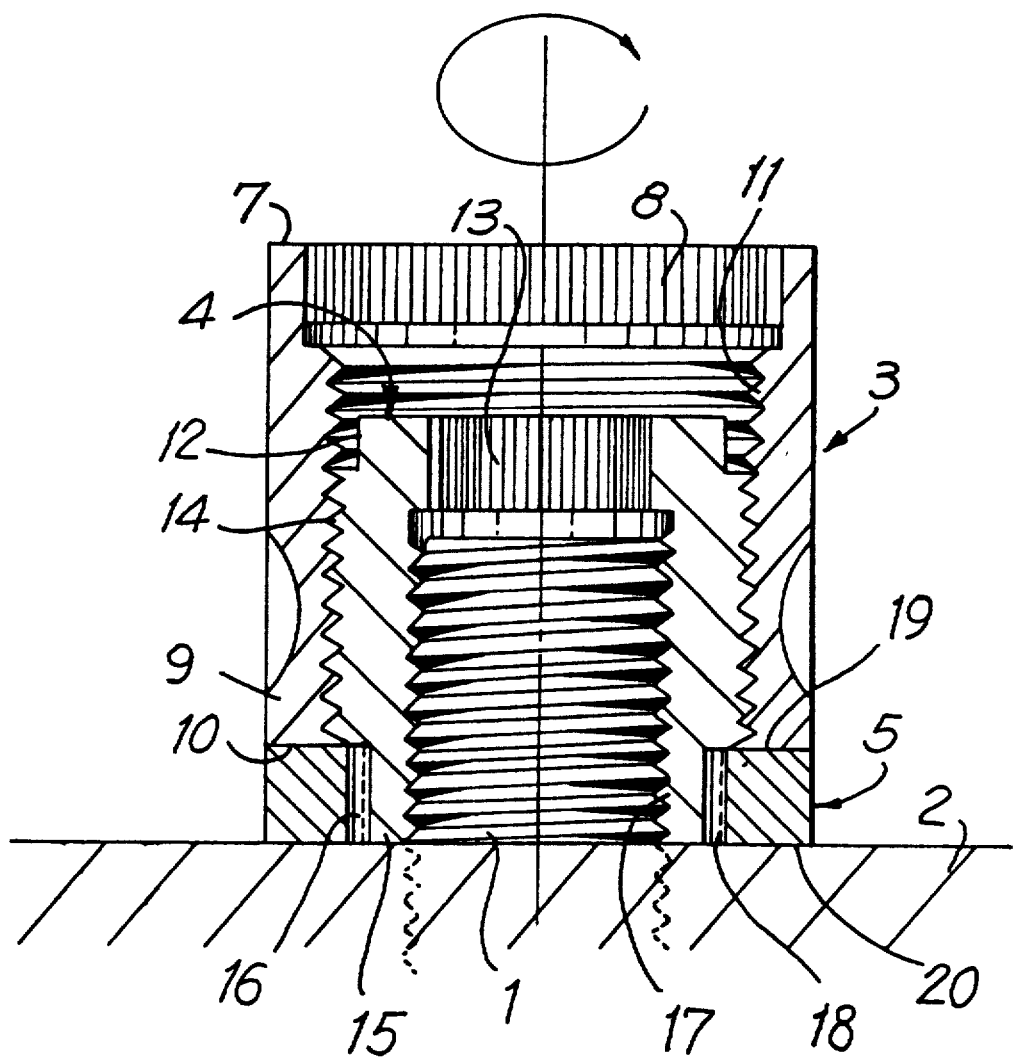
FIG. 1 of the drawings is a view showing a cross-section of a mechanical tensioner for elongating and relaxing a stud in accordance with the present invention.
Figure 2:
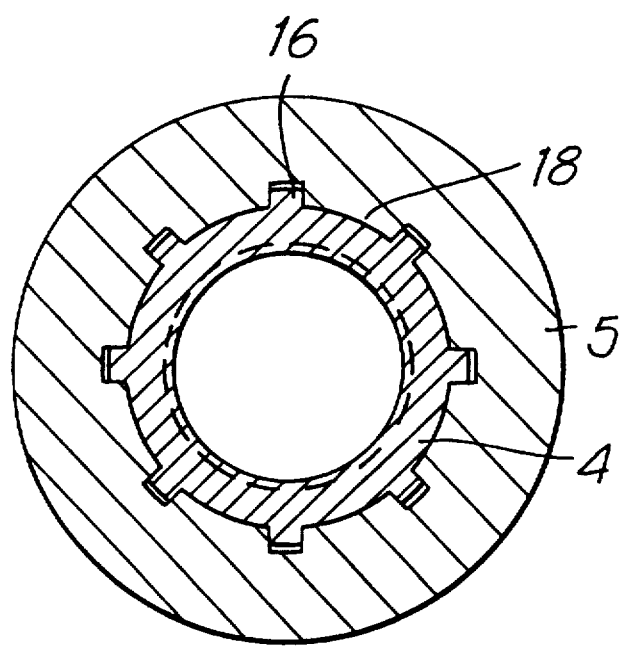
FIG. 2 is a view showing a section of the invention mechanical tensioner in the region of connection between one of its parts and a friction element.

A mechanical tensioner in accordance with the present invention is used for elongating and relaxing a stud 1 which is arranged in an outside object such as a flange 2 and the like. The mechanical tensioner has an outer part which is identified as a whole with reference numeral 3, an inner part which is identified as a whole with reference number 4, and a friction element which is identified as a whole with reference numeral 5.

The outer part 3 has an end portion 7 facing away of the flange 2 and provided with engaging formations, for example splines 8, to be engaged by a tool. The outer part 3 also has a portion 9 which faces toward the flange 2 and has a surface 10 arranged to abut against the friction element 5. Finally, the outer part 3 has an inner thread 11. The outer part 3 is formed as a tubular member provided with the above specified formations.

The inner part 4 has an end portion 12 which faces away of the flange 2 and is provided with a plurality of engaging formations, for example splines 13, to be engaged by a tool. It also has an outer surface provided with a thread 14 which engages with the thread 11 of the inner surface of the outer part 3. The inner part 4 has a portion 15 which is located inside the cooperating part 4 and has an outer surface provided with engaging formations, for example splines 16. Finally, the inner part 4 has an inner surface provided with engaging formations formed for example as an inner thread 17, for engaging with the stud 1. The inner part 4 is also formed as a tubular member.

The friction element is disc shaped. It is located between the end portion 9 of the outer part 3 and the flange 2 on the one hand, and surrounds the portion 15 of the inner part 4 on the other hand. The friction element 5 has an inner surface 18 provided with a plurality of engaging formations, for example splines 18, which engage with the splines 16 of the portion 15 of the inner part 4. The friction element 5 has a surface 19 against which the surface 10 of the outer part 3 abuts, and also an opposite surface 20 which abuts against the outer surface of the flange 2.

The thread 11 of the outer part 3 and the thread 14 of the inner part 4 have one direction, while the thread 17 of the inner part 4 has another direction. For example, the thread 17 is a right-hand thread, while the threads 11 and 14 are left-hand threads.

It can be seen that the inner part 4 has four surfaces cooperating with other parts and subjectable to friction. In particular, it has the surface of the inner thread 17, the surface of the other thread 14, the end surface abutting against the friction element 5, and the end surface abutting against the flange 2. In contract, the outer part 3 has only two surfaces which are subjectable to friction, namely the surface of the inner thread 11, and the surface 19 abutting against the friction element 5.

During operation a tool is applied to the mechanical tensioner so that it engages the splines 8 of the outer part 3 to move the latter and also engages the splines 13 of the inner part so as to at least hole the part 4. When the outer part 3 is moved in a direction which is transverse to an axis of the tensioner and the stud or more particularly is turned about this axis, its surface 10 abuts against the surface 19 of the friction element 5 and therefore the outer part 3 cannot move further onto the friction element 5 in the axial direction. Under the action of turning of the outer part 3 and due to the cooperation between the threads 11, 14 the inner part 4 is displaced in the axial direction, upwardly in the drawings, and at the same time does not displace in the transverse direction or in other words does not turn around the axis. During these movements the friction element 5 is neither displayed in the transverse direction (turned around the axis) nor in the axial direction. It is immovable relative to the flange 2. The axial upward displacement of the inner part 4 without the transverse displacement (turning around the axis) causes pulling of the stud 1 upwardly and therefore its elongating.

Thus due to inventive cooperation of the parts 3 and 4 and the friction element 5 which imparts a higher friction to the inner part 4 than the outer part 3, when a force is applied to one of the parts 3, 4 in a transverse direction to the axis (by applying a force to one part, by holding one part and turning another part, by turning both parts in opposite directions with equal forces), after elimination of the gaps in the assembly the outer part 3 moves only in the transverse direction to the axis (rotates) while the inner part 4 moves only in an axial direction to pull the stud 1 upwardly in the axial direction.

It is to be understood that in order to relax the stud 1 the outer part 3 must be displaced in an opposite transverse direction (turned around the axis in an opposite direction) so that the inner part 4 is displaced axially downwardly and the stud is therefore relaxed.

It will be understood that each of the elements described above, or two or more together, may also find a useful application in other types of constructions differing from the types described above.

While the invention has been illustrated and described as embodied in a mechanical fastener for elongating and relaxing a stud, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A mechanical tensioner for elongating and relaxing a stud having an axis and arranged in an object, comprising at least two parts including a first part connectable with said stud to pull said stud in an axial direction so as to elongate said stud and thereby to tension it in said object, or to relax said stud, a second part connected with said first part, a friction element which cooperates with at least one of said parts, said second part being freely turnable relative to said friction element while freely abutting against the latter, so that when a force is applied to at least one of said parts in a transverse direction to said axis, said second part moves in said transverse direction and said first part moves only in said axial direction to move said stud in said axial direction so as to elongate said stud, said second part having a threaded inner surface, said friction element having a polygonal inner surface, said first part having a plurality of formation. For engagement by a tool and having an outer surface with two axially spaced portions including a first cylindrical axial portion which is threaded and engages with said threaded inner surface of said second part and a second axial portion which is polygonal and engages with said polygonal inner surface of said friction element.

* * * * *